Aug. 11, 1964  G. J. CAMPBELL, JR  3,144,068
LUGGED CROSS-CHAIN FOR VEHICLE TIRES
Filed April 17, 1963

INVENTOR.
GEORGE J. CAMPBELL, JR
BY
ATTORNEY

United States Patent Office 3,144,068
Patented Aug. 11, 1964

3,144,068
LUGGED CROSS-CHAIN FOR VEHICLE TIRES
George J. Campbell, Jr., York, Pa., assignor to Campbell Chain Company, York, Pa., a corporation of Pennsylvania
Filed Apr. 17, 1963, Ser. No. 273,680
5 Claims. (Cl. 152—245)

This invention relates to a tire chain of the type used for anti-skid purposes on vehicle tires, and, more particularly, it pertains to a cross-chain for such tire chains of which at least the links thereof which engage the road surface are each provided with lugs so as to enhance the anti-skid properties of the cross-chain and the individual links thereof.

At present, tire chains are manufactured with lugs on the links of the cross-chains thereof, but the attachment of such lugs to the individual links is quite costly, due primarily to the substantial number of manufacturing steps required to form not only the individual links, but to apply the lugs to said links. Such lugs comprise a short metal bar, frequently somewhat V-shaped in cross-section, which extends transversely across the links of a cross-chain, intermediately of the ends thereof, and the lugs are welded adjacent the ends thereof to the opposite side portion of the chain links.

Chain stock used for cross-chains, whether provided with lugs or otherwise, is of the type in which the ends of each link are substantially uniformly twisted relative to each other about the longitudinal axis of the link, whereby such opposite ends thereof extend in directions approximately at 90° to each other. By such an arrangement, when the chain is laid upon a relatively flat surface, it will lie thereon with a minimum amount of projecting, protruding surfaces, especially in comparison with the projecting surfaces which would be encountered if non-twisted, conventional, elongated link chain were used for cross-chain purposes. By the use of such twisted links, minimum wear and damage is imposed upon the tires to which such anti-skid chains are connected, both with respect to the wearing surface of the tires, as well as the internal construction of the carcass thereof. Also, a substantially knobby anti-skid surface is provided which engages the road surface. Therefore, twisted link chain of the type referred to has been adopted substantially universally by all manufacturers of anti-skid tire chains as the most suitable type of chain for cross-chains.

In accordance with the currently used procedure for making cross-chains of such twisted type, the required steps currently employed comprise the feeding of wire stock to a chain-forming machine, which automatically severs the wire stock into suitable uniform lengths sufficient to form individual links of the chain. Such severed lengths of wire stock are bent around forming elements to produce a conventional, elongated, flat link of a chain having end surfaces which are transverse to the sides of the links and substantially abut each other. The next procedure is to individually connect the abutting ends firmly by butt welding said end surfaces on each link. As the links are successively welded, they pass to mechanism in the forming machine which automatically twists each link about its longitudinal axis to dispose the opposite ends thereof substantially at 90° to each other.

If the chain is to be used for the cross-chains of tire chain assemblies having lugs on the cross-chains, said chain stock thus formed then is directed to additional mechanism which automatically feeds lug stock wire or coiled pre-shaped bar stock to the machine where such stock automatically is severed into suitable lengths to form the lugs, one such length being furnished for each link of the chain to which it is to be connected. Incident to severing the desired length of lug stock from the supply thereof, additional shaping of the lug simultaneously is achieved, such as by forming indentations in the outer edge of the lug, or shaping the surfaces of the lug which are to engage the sides of the link suitably to conform to said surfaces within acceptable limits. To complete the formation of each link, the lug is clamped to the chain link to which it is to be connected and, usually through the employment of spot welding equipment, the opposite ends of such lug are secured permanently to the opposite sides of each link which is to receive such lug.

As a sidelight in the manufacturing of cross-chains with lugs having no particular relationship to the present invention, it should be noted that, in the manufacturing of cross-chain stock, only a predetermined number of successive links are provided with cross lugs, followed by the formation of at least three successive links without lugs, before an additional predetermined number of links are formed in succession with lugs. Thus, between each group of links with lugs, there are three links without lugs. The middle link of these three is severed to separate the individual cross-chains from each other, and thereby provide cross-chains which have said predetermined number of successive links with lugs thereon and one link at each end of said group of lugged links which does not have a lug, these plain links being for purposes of receiving the looped hooks by which the opposite ends of the cross-chains are connected to the side chains of the sets of tire chains.

Before each of the individual cross-chains are separated from each other by severing the middle link of each group of three plain links, the manufactured, continuous chain thus far produced by the preceding steps described above is subjected to conventional tempering and, preferably, casehardening of all components of the chain so as to render the same more capable of withstanding abrasion in engagement with road surfaces. Following the tempering operation, and particularly if scale is produced, the chain is subjected to additional finishing operations, including pickling, if necessary, prior to the dipping or plating of the chain to form a rust-resistant surface thereon, as well as a coloring finish which is esthetically appealing, such as by the application of a bright brass coating, copper, or the like.

It will be seen from the foregoing that the formation of anti-skid cross-chains by the above-described procedure, and particularly cross-chains having lugs thereon, involves a rather substantial number of steps and, notwithstanding the fact that these steps are performed by automatic machinery, they result in the cost of cross-chains, and particularly cross-chains having lugs thereon, being substantial.

It is the principal purpose of the present invention to fabricate a cross-chain, and especially a cross-chain having lugs thereon, by the use of a manufacturing process which substantially reduces the cost of producing such cross-chain by the reduction of the number of manufacturing steps, as compared with currently used procedures, and without diminishing the durability and wear-resistance of the chain.

It is another object of the invention to form the aforementioned cross-chains by a procedure which, primarily, involves only two steps, the first being to form individual links of the chain from equal lengths of wire stock, said links initially being formed in twisted condition, prior to welding the ends thereof and having the ends of the link abutting each other intermediately of the ends of one side of the link, and the second step comprising applying the desired lengths of cross lug stock to each link which is to receive the same so that said lugs extend transversely across the sides of the links and the end of the lug which engages the side of the link that includes the abutting ends is disposed immediately over said abutting ends, followed by connecting the opposite ends of the lug to said sides of the chain by spot welding to simultaneously connect the abutting ends of the link together and thereby greatly reduces the time consumed, steps required, and welding cost in the formation of such lug-type cross-chains.

A further object of the invention is to provide a plurality of different embodiments of configurations of abutting ends of each link of the cross-chain so as to render the same highly acceptable for permanent connection through the employment of spot welding, as distinguished from butt welding.

Details of the foregoing objects and of the invention, as well as other objects thereof, are set forth in the following specification and illustrated in the accompanying drawing comprising a part thereof.

In the drawing:

FIG. 1 is a transverse sectional view through an exemplary pneumatic tire carcass of conventional vehicle type having around the outer surface of the tread thereof a cross-chain having lugs thereon, said cross-chains and lugs being made in accordance with and embodying the principles of the present invention.

FIG. 2 is a side elevation of a short length of preformed link chain, the perspective being selected at 30° to the horizontal to facilitate the illustration thereof, said view showing the approximate condition of the abutting ends of each link prior to being welded and showing the links as initially formed through the single step of bending the links around suitable forming elements in a chain-forming machine suitably modified to produce such links in accordance with the principles of the present invention.

Figure 1:
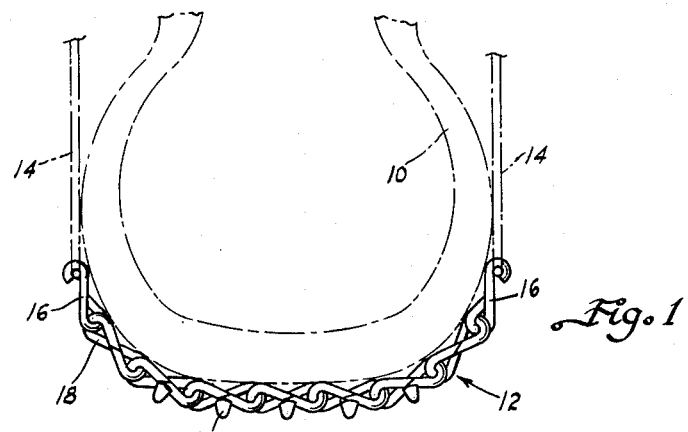

Referring to the drawing, and particularly FIG. 1, a sectional elevation of an exemplary tire carcass 10 illustrates the conventional manner in which a cross-chain 12 extends partially therearound and across the tread portion of the tire, the opposite ends of the cross-chain being connected to side chains 14, illustrated diagrammatically in phantom, by means of conventional loop-type hooks 16. The cross-chain 12, as illustrated in FIG. 1, is made in accordance with the principles of the present invention and consists of individual links 18, which are of the type that are elongated and provided with what is designated as a half-twist about their longitudinal axis to dispose the opposite ends thereof in planes substantially at 90° to each other. This half twisted-type chain has long been accepted as having the most efficient gripping surface and also is less damaging to tires than other shapes for use as cross-chains, since it will be seen from FIG. 1 particularly that, primarily, only transversely and longitudinally spaced pairs of rounded ends of the connected links engage the tire tread surface and a similar surface is presented at a roadway for gripping purposes.

Figure 2:
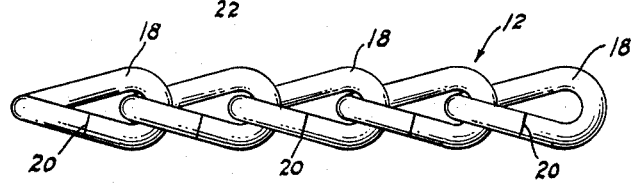

Referring to FIG. 2, a short length of chain is illustrated in unfinished condition in that, in accordance with the invention, successive lengths of wire stock from which the links 18 are formed are fed to a chain-forming machine, which is adapted to twist said lengths around forming mechanism arranged so as to initially form pre-formed links which resemble half-twisted links, i.e., links having the opposite ends twisted about the longitudinal axis 90°, as distinguished from so-called flat links of which both sides are disposed within a common plane. As indicated above, conventional twisted chain first is manufactured by bending similar links of wire stock into flat links, butt welding the abutting ends of the links, and subsequently acutally twisting the links, thereby requiring a minimum of three steps to form twisted-link chain. Also, in accordance with the normal procedure for making twisted-link chain, it does not matter where the connection of the ends of each link is located between the ends of the link. However, in accordance with the present invention, the links 18, in the preliminary formation step, not only are pre-formed to resemble twisted links, but the abutting ends of the chain are located, with reasonable accuracy, preferably midway of the ends of each link, as illustrated in FIG. 2, wherein the opposite ends 20 are disposed substantially in abutting engagement with each other but have not been welded.

Figure 3:
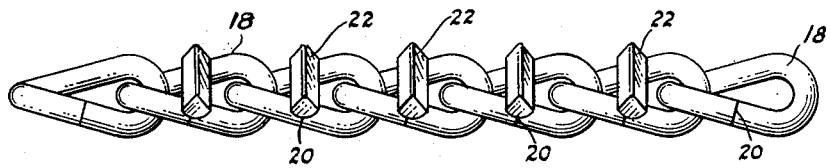
FIG. 3 is a perspective view of an exemplary cross-chain illustrating the second step in the formation of lugged type cross-chains in accordance with the principles of the present invention.

It also is to be understood that the illustration of the lengths of chain shown in FIGS. 2 and 3, both of which comprise pre-formed links, are shown in perspective as seen at approximately 30° to the horizontal to render the illustration simpler than showing the links and chain sections in true side elevation. Also, while the sides of the individual links are shown to be substantially straight in FIGS. 2 and 3, it is to be understood that in the actual formation thereof, the opposite sides actually have more curvature than is shown in FIGS. 2 and 3 and more closely resemble a flatted S when viewed in side elevation.

Following the initial formation of the aforementioned preformed links having abutting ends 20 by a single operation as described above, the next step in the process of manufacture in accordance with the present invention comprises the feeding of cross lug stock, either in straight or coiled rod, or wire formation, or severed pieces, by automatic machinery, to the formed but unwelded links of chain as said partially completed chain is moved through the machine. The rod or wire stock from which the cross lugs 22 are formed may be of any suitable cross-sectional shape, the particular shape thereof shown in FIGS. 3–8 being a preferred one, but such shape is not to be regarded as restrictive. However, in accordance with the invention, and particularly since the supplying of the lug stock takes place separately from the formation of the individual links of the chain, it is possible, in accordance with the invention, to feed lug stock of different cross-sectional shape for attachment to the chain links than the shape of the wire stock, for example, from which the individual chain links are formed. This comprises an advantageous feature of the present invention.

Figure 9:
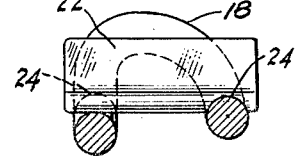
FIG. 9 is a sectional view taken on the line 9—9 of FIG. 4 and showing an exemplary formation of the ends of a cross lug to enhance the connection thereof to the sides of each link.

As the cross lug stock is fed to the machine and is disposed successively across each link as the links are advanced in the machine for the reception of the lug members 22, the required, uniform lengths of the lug stock are sheared from the outer end of the supply rod or coil to form the individual lugs 22. Incident to shearing the lugs 22 from the supply stock, they also may be provided with any other additional configurations which might be desired, such as by forming indentations or notches in the uppermost surface thereof, as is sometimes desired, though not illustrated in the present drawing, or to provide the lugs 22 with exemplary indentations 24, either at one or both ends thereof, within the surface of the lug that engages the sides of the link 18, as illustrated clearly in FIG. 9.

The purpose of the indentations 24 is to effect close conformity and appreciable co-engaging surface areas on the lugs and the sides of the links to which they are connected. This aspect of the structure is especially advantageous with respect to the indentation 24 in the end of the lug which engages the abutting ends 20 of the side of the link which contains the same, regardless of the type of abutting end configuration employed of the various exemplary embodiments illustrated in the drawing and described hereinafter in detail.

Prior to the lugs being sheared from the bar or rod stock, they are stamped, swedged or otherwise processed to provide any shape desired in the lugs, such as indentations 24. Such pre-formed lug stock then is fed to the chain-forming machine and individual lugs are sheared from the end of the stock or individual lugs may be fed from a hopper successively to the links to which they are to be connected, so as to be disposed across the opposite sides of each such link, relatively precisely, intermediately of the ends of each link. Particularly, the end of each lug which engages the side of each link having the unwelded abutting ends is disposed quite accurately over such abutting ends substantially in the manners shown respectively, in enlarged side elevation, in FIGS. 4-8, each of which represent a different embodiment of the invention.

With the placement of each lug in such relationship with each link to which a lug is to be connected, said lugs and links are clamped in welding equipment embodied in the chain-forming machine and, preferably by the use of spot welding, the opposite ends of the lugs not only are simultaneously connected respectively with the opposite sides of each link, but, in addition, the abutting ends 20 of one side of each link simultaneously are welded together by the single spot welding operation which secures the cross lugs to the links. Thus, only a single welding operation is required for each link having a lug connected thereto, as distinguished from multiple operations respectively comprising butt welding the ends of the chain links together and, subsequently, spot welding the lugs to the previously welded links. Further, the consumption of current and overall expense of spot welding is substantially less than that required to effect a butt-type weldment.

In view of the fact that butt welding involves the passing of current substantially lengthwise through chain stock so as to traverse the abutting ends of a chain link and fuse the same momentarily sufficiently to weld the ends together, and such method of welding also includes more complex types of electrode contacts which engage the opposite ends of the links, the use of spot welding to achieve connections of the various elements of a lug-type link together is a substantially less complex procedure and is substantially less expensive to perform.

Spot welding, however, utilizes opposed contacts or electrodes which engage opposed surfaces of members to be connected by spot welding and the fusing current passes axially between the electrodes. Accordingly, and particularly to effect simultaneous connection of the abutting ends of the links together and the connection of the cross lugs to the opposite sides of each chain link, it is preferred that the configuration of the abutting, complementary ends of each link to be employed in accordance with the principles of the present invention be such that the passage of current through the assembled cross lug and abutting complementary end surfaces of the links preferably shall be at least partially transverse through all such abutting surfaces on the cross lugs and ends of the links. This will form effective and durable connections by spot welding, one of which, at one side of the link, is of a compound nature comprising superposed weldments respectively connecting one end of the lug to one side of the link and the ends of said side together. Generally considered, the axis of the weldment, i.e., the path followed by the welding current, is substantially perpendicular to the longitudinal plane of the link being welded.

Figure 4:
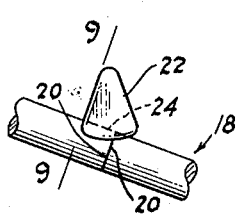
FIG. 4 is a fragmentary view of the side of an exemplary, pre-formed chain link of the type shown in FIGS. 1–3 and illustrating one embodiment of abutting end configuration engaged by one end of an exemplary cross lug in a manner to permit spot welding to effect simultaneous connection of the abutting ends of the link to each other and to one end of the cross lug.

In accordance with the foregoing, it will be seen, by reference particularly to FIGS. 4-8, that the transverse abutting ends 20 of the embodiment shown in FIG. 4 are disposed at somewhat of an angle to the vertical axis extending downwardly through the cross lug 22, as viewed in FIG. 4, which axis is parallel to the side of the sheet of drawing. This results in a compound spot welded connection which simultaneously connects the cross lug to both sides of the link and also connects the abutting ends of the link together.

In comparison with the embodiment shown in FIG. 4, however, the other embodiments respectively shown in FIGS. 5-8 offer even greater advantages with respect to utilizing coextensive abutting areas of appreciable size in the complementary ends of the links which are to be permanently secured by spot welding, as well as having the cross lugs 22 connected to the links by the same spot welding step.

Figure 5:
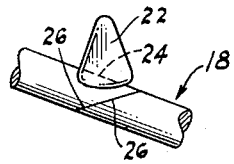
FIGS. 5–8 illustrate views similar to that shown in FIG. 4, but respectively of different embodiments of abutting ends which may be employed for each link and having configurations suitable for the application of spot welding to effect connection not only of the abutting ends of each link to each other, but also the connection of one end of the cross lug thereto.

Considering each of these additional embodiments individually, it will be seen that in FIG. 5 the ends of the link which are to be connected by spot welding comprise complementary, coextensive abutting areas 26 which are at an acute angle to the longitudinal axis of the side of the link 18 containing the same and, therefore, offer surfaces nearly perpendicular to the axis between the welding electrodes.

Figure 6:
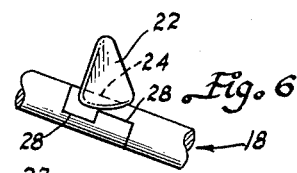
Figure 7:
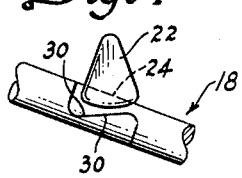

In FIGS. 6 and 7, there respectively are illustrated two different embodiments of what might be described generally as an S configuration of complementary, overlapping surfaces which are coextensive in area, the surfaces 28 in FIG. 6 comprising components which are at relatively sharp angles to each other, whereas the surfaces 30 in FIG. 7 comprise components which are connected by smooth curves, both of these configurations in the ends of the links, however, being of an interlocking nature.

Figure 8:
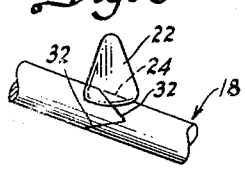

In FIG. 8, interfitting V-shaped end surfaces 32 are provided which afford abutting surfaces at different angles to the axis between the welding electrodes.

The various configurations of the abutting ends of all of the embodiments shown in detail in FIGS. 4-8 conveniently may be formed automatically by the shearing apparatus used to sever the individual lengths of wire or bar stock incident to cutting said lengths from said stock by the automatically operated shearing mechanism of the chain-forming machine.

While the invention has been described and illustrated in its several preferred embodiments, it should be understood that the invention is not to be limited to the precise details herein illustrated and described, since the same may be carried out in other ways falling within the scope of the invention as claimed.

I claim:

1. An anti-skid cross-chain for use with vehicle tires comprising a plurality of connected links each similarly formed from similar lengths of wire-like stock and having substantially a half-twist in each link and also having complementary ends abutting substantially midway of the ends of each link, and a cross lug positioned substantially transversely across each link approximately midway between the ends of each link and of sufficient thickness to project above one surface of said link when lying in flat condition upon a supporting surface, said cross lugs being permanently connected to opposite sides of said links by being spot welded thereto and one of said spot welded connections being compound and comprising superposed weldments respectively connecting said abutting ends of each link together and connecting one end of a lug to said abutting ends.

2. An anti-skid cross-chain for use with vehicle tires comprising a plurality of connected links each similarly formed from similar lengths of wire-like stock and having substantially a half-twist in each link and also having ends which are complementary and abutting substantially midway of the ends of each link, and a cross lug comprising a cut length of stock initially separate from said links and having a cross-sectional shape different from that of the link stock and extending substantially transversely across and overlying the opposite sides of each link approximately midway between the ends of each link, said lugs being permanently connected to said opposite sides of said links by being spot welded thereto and one of said spot welded connections being compound and comprising superposed weldments respectively connecting said abutting ends of each link together and connecting one end of a lug to said abutting ends.

3. An anti-skid cross-chain for use with vehicle tires comprising a plurality of connected links each similarly formed from similar lengths of wire-like stock and having complementary end surfaces commonly disposed substantially within at least one plane extending generally transverse to an axis substantially perpendicular to the longitudinal plane of the link, said end surfaces also abutting and being positioned approximately midway of the ends of each link, and a cross lug positioned substantially transversely across each link approximately midway between the ends of each link, said lugs being permanently connected to said opposite sides of said links by being spot welded together and one of said spot welding connections being compound and comprising superposed weldments respectively connecting said abutting ends of each link together and connecting one end of a lug to said abutting ends.

4. An anti-skid cross-chain for use with vehicle tires comprising a plurality of connected links each similarly formed from similar lengths of wire-like stock and having complementary end surfaces overlapping each other and abutting substantially midway of the ends of each link, and a cross lug positioned substantially transversely across the opposite sides of each link approximately midway between the ends of each link, said lugs being permanently connected to said opposite sides of said links by being spot welded thereto and one of said spot welded connections being compound and comprising superposed weldments respectively connecting said abutting ends of each link together and connecting one end of a lug to said abutting ends.

5. The cross-chain set forth in claim 4 further characterized by said overlapping ends of each link having configurations providing interlocking of the ends in a direction longitudinally of said links.

References Cited in the file of this patent
UNITED STATES PATENTS

| | | |
|---|---|---|
| 1,696,255 | Reyburn | Dec. 25, 1928 |
| 1,803,187 | Hoff et al. | Apr. 28, 1931 |